United States Patent
Guillot et al.

(10) Patent No.: US 6,228,137 B1
(45) Date of Patent: May 8, 2001

(54) PROCESS FOR PRODUCING A FOAMING SLAG ABOVE A STAINLESS STEEL MELTED IN AN ELECTRIC FURNACE

(75) Inventors: Yves Guillot, Ugine; Luc Sollier, Moutiers; Olivier Bletton, Ugine; Frederic Descaves, Molinghem, all of (FR)

(73) Assignees: Ugine-Savoie Imphy, Ugine; Ugine SA, Puteaux, both of (FR)

( * ) Notice: Subject to any disclaimer, the term of this patent is extended or adjusted under 35 U.S.C. 154(b) by 0 days.

(21) Appl. No.: 08/928,500

(22) Filed: Sep. 12, 1997

(30) Foreign Application Priority Data

Sep. 12, 1996 (FR) .................................................. 96 11120

(51) Int. Cl.$^7$ ............................... C21B 3/02; C21B 13/12
(52) U.S. Cl. ......................... 75/10.53; 75/961; 75/10.62; 75/561; 75/570
(58) Field of Search .............................. 175/10.41, 10.46, 175/10.62, 10.53, 329, 561, 570; 148/26; 75/961

(56) References Cited

U.S. PATENT DOCUMENTS

| | | | |
|---|---|---|---|
| 4,528,035 | 7/1985 | Simpson, Jr. et al. | 75/257 |
| 4,913,732 | * 4/1990 | Miyano et al. | 75/10.46 |
| 4,986,847 | * 1/1991 | Knapp et al. | 75/525 |
| 5,493,580 | * 2/1996 | Fudala et al. | 75/10.61 |
| 5,733,356 | * 3/1998 | Konig et al. | 75/10.29 |

FOREIGN PATENT DOCUMENTS

| | | |
|---|---|---|
| 0 162 679 | 11/1985 | (EP) . |
| 0 655 508 | 5/1995 | (EP) . |
| 88 577 | 6/1995 | (LU) . |

OTHER PUBLICATIONS

Database WPI, Section Ch, Week 7808, Derwent Publications Ltd., London, GB; and JP 53 001 618 A, (Nisshin Steel Co. Ltd.), Jan. 9, 1978.

* cited by examiner

*Primary Examiner*—Roy King
*Assistant Examiner*—Tima McGuthry-Banks
(74) *Attorney, Agent, or Firm*—Oblon, Spivak, McClelland, Maier & Neustadt, P.C.

(57) ABSTRACT

A process for producing a foaming slag above a stainless steel melted in an electric furnace, in which:

a powder containing at least one metal oxide and carbon in its composition is introduced into the slag, at least one oxide present in the powder is reduced by its reaction with the carbon to form in the slag bubbles composed of the metal of the metal oxide and of carbon monoxide, the bubbles present in the slag giving rise to a slag in the form of a stable foam.

10 Claims, No Drawings

PROCESS FOR PRODUCING A FOAMING SLAG ABOVE A STAINLESS STEEL MELTED IN AN ELECTRIC FURNACE

BACKGROUND OF THE INVENTION

1. Field of the Invention

The present invention relates to a process for producing a foaming slag above stainless steel melted in an electric furnace.

2. Discussion of the Background

In the field of melting stainless steel in an electric furnace, the furnace burden of iron scrap, offcuts and ferroalloys is converted into liquid metal by virtue of the generation of electric arcs between the furnace electrodes and said burden.

The production of the steel gives rise to residual products such as dust which is recovered by dust precipitators, approximately 90% of which is recycled in the form of pellets reintroduced into the electric furnace. The remaining 10%, containing too much zinc oxide, is at present stored. The slag is removed after melting.

In the field of melting of nonstainless steels, the principle of foaming slag is based on the reduction of the iron oxide present in the slag. The reduction of the iron oxide is performed by injecting carbon powder into the furnace; a reduction which gives rise to carbon monoxide. The bubbles of carbon monoxide trapped in the molten slag make the latter foam and consequently increase its volume. The slag in foam form coats the end of the electrode and protects the refractories from the electric radiation, and this allows a saving, in the consumption of the electrode, in electricity consumption and in the consumption of the refractories.

In the case of the melting of stainless steels the slag is not sufficiently rich in iron oxide and, as a result, the principle of the foaming slag employed in the production of nonstainless steels is no longer applicable.

SUMMARY OF THE INVENTION

One object of the invention is to provide a process for generating a controlled and stable foaming slag above a molten stainless steel, in an electric furnace, by modifying the slag so as to create foaming in said slag.

DETAILED DESCRIPTION OF THE INVENTION

The subject matter of the invention is a process for producing a foaming slag above a stainless steel melted in an electric furnace, in which:

- a powder containing at least one metal oxide and carbon is introduced into the slag,
- at least one oxide present in the powder is reduced by its reaction with the carbon to form in the slag bubbles composed essentially of the metal in the gaseous state of the metal oxide and of carbon monoxide, the bubbles present in the slag giving rise to a slag in the form of a stable foam.

Other characteristics of the invention include:

- the metal oxide is oxide of a volatile element,
- the metal oxide is chosen from zinc oxide and lead oxide,
- at least a portion of the powder originates from dust generated by the electric furnace for producing the steel,
- the powder is introduced by injection under a dry fluid,
- the fluid is chosen from nitrogen and argon.

Thus, according to the invention there is introduced into the furnace for producing the stainless steel and into the slag a metal oxide and carbon, in the form of a powder, a metal oxide which by its reduction with the carbon forms, on the one hand, a gas of the metal element of the oxide and, on the other hand, carbon monoxide, the bubbles generated by these gases, trapped in the slag, giving rise to a slag in the form of stable foam.

According to the invention the powder preferably contains zinc oxide in its composition. The powder consists of electric furnace dust with a high zinc content resulting from the gradual enrichment in ZnO of said dust while it is being recycled in the steelworks.

The use of electric furnace dust, with a high zinc content, makes it possible to employ a byproduct originating from the production of stainless steel. The zinc element of the zinc oxide preferably employed takes part in the formation of the bubbling, since the zinc is in the gaseous state at the temperature of the slag.

The zinc oxide is reduced by the carbon to give gaseous zinc and carbon monoxide, both of which will cause the foaming of the slag according to the reaction:

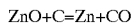

$$ZnO + C = Zn + CO$$

In an example of the invention, from 500 kg to 1000 kg of powder with a high zinc content are injected into an electric furnace by means of an injection machine. The injection fluid is preferably nitrogen, to avoid the risks of explosion as a result of the moisture in air.

According to the invention the base slag for the production of stainless steels may be composed of 35% to 40% of $SiO_2$, of 40% to 45% of CaO, of 5% of $Cr_2O_3$, of 5% of $Al_2O_3$, the remainder being made up of a few % of MnO and of MgO, and of less than 1% of FeO. This slag contains practically no iron oxide.

As a result of the reduction of the metal oxide by the carbon and of the resulting gases, an increase is found in the thickness of the base slag, which reaches several tens of centimeters, the slag in foam form preferably coating the current feed electrode in an electric furnace. The slag foaming obtained with the invention is controlled and stable.

The powder comprising metal oxide and carbon may contain carbon in any form, including graphite and coke. The amount of metal oxide to carbon in the powder in wt % is not limited, and is preferably 85:15–15:85 metal oxide:carbon, more preferably 75:25–50:50 including 70:30, 65:35, 60:40, and 55:50. Approximately 0.5–2.5 weight units (e.g., tons) of metal oxide and carbon are added to approximately 3 identical weight units of slag, preferably 1–2 weight units, more preferably 1.5 weight units.

French patent application 96 11 120 filed Sep. 12, 1996, is incorporated herein by reference.

What is claimed as new and desired to be secured by Letters Patent of the United States is:

1. A process for producing a foamed slag above a stainless steel melted in a electric furnace, comprising:
   introducing into a $Cr_2O_3$-containing slag above a stainless steel melted in a electric furnace a powder comprising carbon and at least one metal oxide selected from the group consisting of zinc oxide and lead oxide,
   wherein the slag contains less than 1% of FeO, and
   wherein said at least one metal oxide present in the powder is reduced by its reaction with the carbon to form in the slag bubbles comprising the metal of the metal oxide in the gaseous state and carbon monoxide and provide a foamed slag.

2. The process as claimed in claim 1, wherein at least a portion of the powder originates from dust generated by an electric furnace for producing the steel.

3. The process as claimed in claim 1, wherein the powder is introduced into the slag by injection under a dry fluid.

4. The process as claimed in claim 3, wherein the fluid is selected from the group consisting of nitrogen and argon.

5. The process as claimed in claim 1, wherein the metal oxide is zinc oxide.

6. The process as claimed in claim 1, wherein said metal oxide and said carbon are present in said powder in a weight ratio of from 85:15–15:85.

7. The process of claim 1, wherein the slag contains 35% to 40% of $SiO_2$ and 40% to 45% of CaO.

8. The process of claim 7, wherein the slag also contains 5% of $Cr_2O_3$ and 5% of $Al_2O_3$.

9. The process of claim 8 wherein the slag also contains MnO and MgO.

10. The process as claimed in claim 1, wherein the metal oxide is lead oxide.

* * * * *